United States Patent
Rothe

(10) Patent No.: US 10,287,974 B2
(45) Date of Patent: May 14, 2019

(54) INTERNAL COMBUSTION ENGINE AND METHOD FOR OPERATING AN INTERNAL COMBUSTION ENGINE

(71) Applicant: Audi AG, Ingolstadt (DE)

(72) Inventor: Albrecht Rothe, Ingolstadt (DE)

(73) Assignee: Audi AG, Ingolstadt (DE)

( * ) Notice: Subject to any disclaimer, the term of this patent is extended or adjusted under 35 U.S.C. 154(b) by 47 days.

(21) Appl. No.: 15/460,824

(22) Filed: Mar. 16, 2017

(65) Prior Publication Data
US 2017/0276069 A1  Sep. 28, 2017

(30) Foreign Application Priority Data

Mar. 26, 2016 (DE) ...................... 10 2016 003 803

(51) Int. Cl.
*F02B 75/06* (2006.01)
*F01P 3/02* (2006.01)
(Continued)

(52) U.S. Cl.
CPC ............... *F02B 75/06* (2013.01); *F01P 3/02* (2013.01); *F02B 63/041* (2013.01); *F02F 1/10* (2013.01); *F02F 1/18* (2013.01); *F03G 7/08* (2013.01); *H02K 1/12* (2013.01); *H02K 1/27* (2013.01); *H02K 9/19* (2013.01)

(58) Field of Classification Search
CPC ......... F02B 75/06; F02B 63/041; H02K 1/12; H02K 9/19; H02K 1/27; F01P 3/02; F02F 1/18; F02F 1/10; F03G 7/08
See application file for complete search history.

(56) References Cited

U.S. PATENT DOCUMENTS 6,748,907 B2 6/2004 Malmquist et al.
2007/0034172 A1* 2/2007 Miyahara ............... F01P 7/167
123/41.1
(Continued)

FOREIGN PATENT DOCUMENTS

CN 202 659339 U 1/2013
DE 1 576 242 10/1970
(Continued)

OTHER PUBLICATIONS

European Search Report dated Aug. 24, 2017 with respect to counterpart European patent application EP 17 15 7034.
Translation of European Search Report dated Aug. 24, 2017 with respect to counterpart European patent application EP 17 15 7034.

Primary Examiner — Jacob Amick
Assistant Examiner — Charles Brauch
(74) Attorney, Agent, or Firm — Henry M. Feiereisen LLC

(57) ABSTRACT

An internal combustion engine, includes a cylinder; a piston supported in the cylinder for linear displacement, wherein the piston is operatively connected with a crankshaft of the internal combustion engine via a piston rod; a linear motor including a stator and a rotor, wherein the stator has an independently operable stator element assigned to the cylinder and partially surrounding the piston in circumferential direction with respect to a longitudinal center axis of the cylinder, wherein the rotor is assigned to or forms a part of the piston, and wherein the linear motor being operable for exerting on the piston a compensation force directed in radial direction.

13 Claims, 2 Drawing Sheets

(51) Int. Cl.
*F02F 1/10* (2006.01)
*F02F 1/18* (2006.01)
*H02K 1/12* (2006.01)
*H02K 1/27* (2006.01)
*H02K 9/19* (2006.01)
*F03G 7/08* (2006.01)
*F02B 63/04* (2006.01)

(56) References Cited

U.S. PATENT DOCUMENTS

| | | | |
|---|---|---|---|
| 2007/0215093 A1 | 9/2007 | Lemke et al. | |
| 2012/0112469 A1* | 5/2012 | Durrett | F01B 11/007 |
| | | | 290/1 A |
| 2013/0302181 A1* | 11/2013 | Charity, III | F04B 35/04 |
| | | | 417/53 |

FOREIGN PATENT DOCUMENTS

| | | |
|---|---|---|
| DE | 24 05 542 | 8/1976 |
| DE | 41 33 948 | 3/1993 |
| EP | 1 398 863 | 3/2004 |
| JP | S59 22957 U | 2/1984 |
| JP | H03 213645 A | 9/1991 |
| JP | H09 303198 A | 11/1997 |
| JP | H11 117779 A | 4/1999 |
| WO | WO 86/04747 A1 | 8/1986 |
| WO | WO 98/16740 | 4/1998 |
| WO | WO 98/21471 | 5/1998 |

\* cited by examiner

INTERNAL COMBUSTION ENGINE AND METHOD FOR OPERATING AN INTERNAL COMBUSTION ENGINE

CROSS-REFERENCES TO RELATED APPLICATIONS

This application claims the priority of German Patent Application, Serial No. 10 2016 003 803.9, filed Mar. 26, 2016, pursuant to 35 U.S.C. 119(a)-(d), the content of which is incorporated herein by reference in its entirety as if fully set forth herein.

BACKGROUND OF THE INVENTION

The invention relates to an internal combustion engine.

The following discussion of related art is provided to assist the reader in understanding the advantages of the invention, and is not to be construed as an admission that this related art is prior art to this invention.

The internal combustion engine serves for example for driving a motor vehicle, i.e. for providing a torque that is directed toward driving the motor vehicle. The internal combustion engine has the at least one cylinder, preferably however multiple cylinders. In the cylinder or in each of the cylinders a respective piston is arranged for linear displacement. During operation of the internal combustion engine fuel and an oxidator, in particular oxygen, for example in the form of air oxygen, are introduced into the cylinder or into a combustion chamber of the cylinder, which is delimited by the cylinder and the piston. The fuel and the oxidator are subsequently combusted, which generates gas forces that cause a displacement of the piston resulting in an increase of the combustion chamber.

The piston is operatively connected with the crankshaft via the piston rod. The crankshaft converts the linear movement of the piston caused by the gas forces, into a rotational movement. During a work cycle of the internal combustion engine the piston rod or its longitudinal center axis forms a variable angle with the longitudinal center axis of the cylinder. This means however that not only a longitudinal force which acts in opposition to the gas forces and is directed parallel to the longitudinal center axis of the cylinder acts on the piston but in addition a transverse force is generated, whose effective direction is perpendicular to the longitudinal force. In other words the transverse force acts on the piston in radial direction with respect to the longitudinal center axis of the cylinder, i.e., it urges the piston in the direction of a piston run surface of the cylinder or against the piston run surface. The transverse force thus increases the friction of the piston at the piston run surface and correspondingly increases friction losses of the internal combustion engine.

It would be desirable and advantageous to provide an improved internal combustion engine which achieves smaller friction losses.

SUMMARY OF THE INVENTION

According to one aspect of the present invention an internal combustion engine includes a cylinder; a piston supported in the cylinder for linear displacement, wherein the piston is operatively connected with a crankshaft of the internal combustion engine via a piston rod; and a linear motor including a stator and a rotor, wherein the stator has an independently operable stator element assigned to the cylinder and partially surrounding the piston in circumferential direction with respect to a longitudinal center axis of the cylinder, wherein the rotor is assigned to or forms a part of the piston, and wherein the linear motor is operable for exerting on the piston a compensation force directed in radial direction. In other words it is provided to integrate the linear motor into the internal combustion engine and to assign the linear motor to the piston. When the internal combustion engine has multiple cylinders at least one of the cylinders has such a linear motor. Of course it can also be provided that a plurality of the cylinders, in particular all cylinders, are each equipped with such a linear motor.

The internal combustion engine can have an arbitrary topography. For example the cylinders of the internal combustion engine are distributed to multiple cylinder banks. Each of the cylinder banks thus has at least one cylinder, preferably however multiple cylinders. In analogy to the above description only one of the cylinder banks, i.e., at least one of the cylinders of the cylinder bank, may be provided with such a linear motor. However, also a plurality or all cylinders of the cylinder bank can be thusly equipped.

The other one of the cylinder banks may not have a linear motor. As an alternative or in addition it can also be provided that at least one of the cylinders of the other cylinder bank is equipped with a linear motor. Also in this case a plurality or all cylinders of the cylinder bank can be correspondingly configured. In the following only the one cylinder and the linear motor assigned to it are discussed. However it is understood that the description may also be applied to multiple cylinders and the linear motors assigned to them.

The linear motor has the rotor and the stator. The rotor is assigned to the piston or is configured as a part of the piston. The stator on the other hand is arranged positionally fixed in relation to the cylinder, and is in particular situated in a cylinder crankcase of the internal combustion engine. The linear motor can be operated as a motor or as a generator; the linear motor can thus also be referred to as a linear machine. It can thus be provided to use the linear motor either for supporting the internal combustion engine, i.e., to increase the torque provided by the internal combustion engine. In this case an operation of the linear motor as a motor is realized in which the linear movement of the piston, which is caused by the gas forces, is supported.

However, the linear motor can also be used as a generator so that a portion of the torque generated or provided by the internal combustion engine is used by the linear motor for providing electrical energy. In this case the linear motor exerts a force on the piston in opposition to the gas forces so that the torque generated or provided by the internal combustion engine is reduced. Particularly preferably one of a plurality of operating modes can be set at the internal combustion engine, wherein the linear motor is operated as a motor in a first one of the operating modes and is operated as a generator in a second one of the operating modes. Of course the linear motor may also be exclusively operated as a generator or exclusively as a motor.

The linear motor is configured so that the compensation force can be exerted by the linear motor on the piston. The compensation force is oriented in radial direction with respect to the longitudinal center axis of the cylinder. The compensation force hereby preferably constitutes a component of the total force that can be exerted on the piston. In order to be able to exert the compensation force, i.e., the component of the total force that is oriented in radial direction, onto the piston a special configuration of the stator is provided. For this purpose the stator element of the stator is provided, which can be separately driven, i.e., it can be driven independent of potential further stator elements, and can in particular be impinged with electrical current.

The stator element engages only partially about the cylinder in circumferential direction. During operation of the linear motor, i.e., when supplying the stator or the separately drivable stator element with current, the piston is urged into the direction, which faces away from the stator or the stator element. The linear motor can thus for example be used to counter the transverse force. In this case the stator or the stator element is arranged accordingly and in addition the linear motor is driven so that the compensation force corresponds to the transverse force, in particular with regard to its amplitude or degree.

According to another advantageous feature of the invention, the stator element is configured as a stator segment, which extends in circumferential direction, wherein the stator has at least one further stator segment, which is arranged in circumferential direction adjacent to the stator element. The stator element thus only represents a segment of the stator so that besides the stator element at least one further stator segment is present. The further stator segment is situated adjacent the stator element or the stator segment. For example it directly neighbors the stator element or stator segment, i.e., it adjoins the latter when viewed in circumferential direction. The stator element and at least one further stator segment can thus be spaced apart or can directly adjoin each other in circumferential direction.

According to another advantageous feature of the invention, the stator segment and the at least one further stator segment can completely engage around the cylinder in circumferential direction. However, the stator segment is operable completely independent of the further stator segment. For exerting the compensation force the stator segment is operated while otherwise—for example when exertion of the force is not intended—additionally or alternatively the at least one further stator segment is operated. For example the stator segment and the at least one further stator segment can be impinged with different voltages and/or current strengths in order to realize the desired compensation force. Overall it is thus possible to only operate the stator element or stator segment, only the further stator segment or the stator element and the further stator element in order to achieve the desired effect of the linear motor.

According to another advantageous feature of the invention, the stator can be arranged in a cylinder crankcase of the internal combustion engine, which crankcase has the cylinder. For this purpose the cylinder crankcase has a corresponding receptacle for the stator. The receptacle is for example formed during casting of the cylinder crankcase and the stator is subsequently inserted into the receptacle. Of course it can also be provided that the stator is cast into the cylinder crankcase.

According to another advantageous feature of the invention, the cylinder can be at least partially surrounded by a water jacket and the stator is arranged in radial direction between the water jacket and a piston run-surface of the cylinder. The water jacket serves for cooling the internal combustion engine, in particular the cylinder crankcase. The water jacket engages about the cylinder in circumferential direction at least partially, preferably to the most part, in particular completely. A coolant, for example cooling water, flows through the water jacket, at least during operation of the internal combustion engine, so that the heat generated during operation of the internal combustion engine is dissipated.

In order to optimize the magnetic flux between the stator and the rotor of the linear motor the stator is arranged in radial direction between the water jacket and the piston run-surface. The term piston run-surface hereby means an inner circumferential surface of the cylinder along which the piston can be linearly displaced. When the piston has at least one piston ring the piston ring can be at least temporarily in contact with the piston run-surface or slide along the piston run-surface.

According to another advantageous feature of the invention, the cylinder can be surrounded in circumferential direction at least partially by a further water jacket and the stator is arranged in axial direction adjacent the further water jacket, in particular below the further water jacket. The further water jacket can be impinged with coolant independent of the water jacket. When viewed in axial direction the further water jacket borders at the water jacket. As an alternative it is spaced apart from the water jacket in axial direction. When viewed in radial direction the water jacket and the further water jacket preferably overlap at least partially, in particular only partially or completely. Preferably the further water jacket also overlaps the water jacket and also the stator when viewed in radial direction. The further water jacket is preferably arranged above the water jacket. This preferably means that the further water jacket is arranged on the side of the water jacket that faces away from the crankshaft. Correspondingly the stator is situated below the further water jacket.

According to another advantageous feature of the invention, the stator element can be arranged at least partially, in particular completely, on a side of an imagined plane, which includes the longitudinal center axis of the cylinder and is arranged parallel to a rotation axis of the crankshaft. The longitudinal center axis of the cylinder thus is situated in the imagined plane. At the same time the imagined plane extends parallel to the rotation axis of the crankshaft.

Particularly preferably the imagined plane includes the rotation axis. The side, which lies on a first side of the plane can for example be referred to as pressure side and the side opposite the pressure side as counter pressure side. The term pressure side means the side to which the piston is urged in a work cycle during operation of the internal combustion engine due to the counter force, which acts in opposition to the gas force. The stator element is at least partially arranged on a side of the imagined plane. In particular it is situated completely on this side. Particularly preferred is further a symmetric arrangement of the stator element with respect to the plane in which the stator element is equidistant to the plane on both sides in circumferential direction.

According to another advantageous feature of the invention, a transverse force which is perpendicular to the plane and acts on the piston due to gas forces occurring during a combustion cycle, faces for a counter pressure side of the plane in the direction of a pressure side of the plane, wherein the stator element is arranged on the pressure side. This was mentioned above. The stator element is particularly preferably arranged completely on the pressure side, in particular symmetrical with respect to the plane. By operating the linear motor the transverse force can be counteracted particularly preferably the transverse force is completely compensated. This enables a particularly low-friction operation of the internal combustion engine.

According to another advantageous feature of the invention, the rotor has at least one permanent magnet or is configured as a squirrel cage rotor. Generally the linear motor or its rotor can be of arbitrary construction. For example the linear motor is configured as permanently excited linear motor for which purpose the rotor has the permanent magnet. As an alternative the linear motor can be configured as a self-exciting linear motor. For this purpose for example the squirrel cage rotor is provided or the rotor is configured as a squirrel cage rotor.

According to another aspect of the invention a method for operating an internal combustion engine, includes the steps of providing an internal combustion engine, which includes a cylinder; a piston supported in the cylinder for linear displacement, said piston being operatively connected with a crankshaft of the internal combustion engine via a piston rod, and a linear motor comprising a stator and a rotor, said stator having an independently operable stator element assigned to the cylinder and partially surrounding the piston in circumferential direction with respect to a longitudinal center axis of the cylinder, said rotor being assigned to or forming a part of the piston; and operating the linear motor for exerting on the piston a compensation force directed in radial direction According to another advantageous feature of the invention the linear motor is at least temporarily operated so that the compensation force acts in opposition to a transverse force, which acts on the piston due to gas forces occurring during a combustion cycle. This was also described above.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
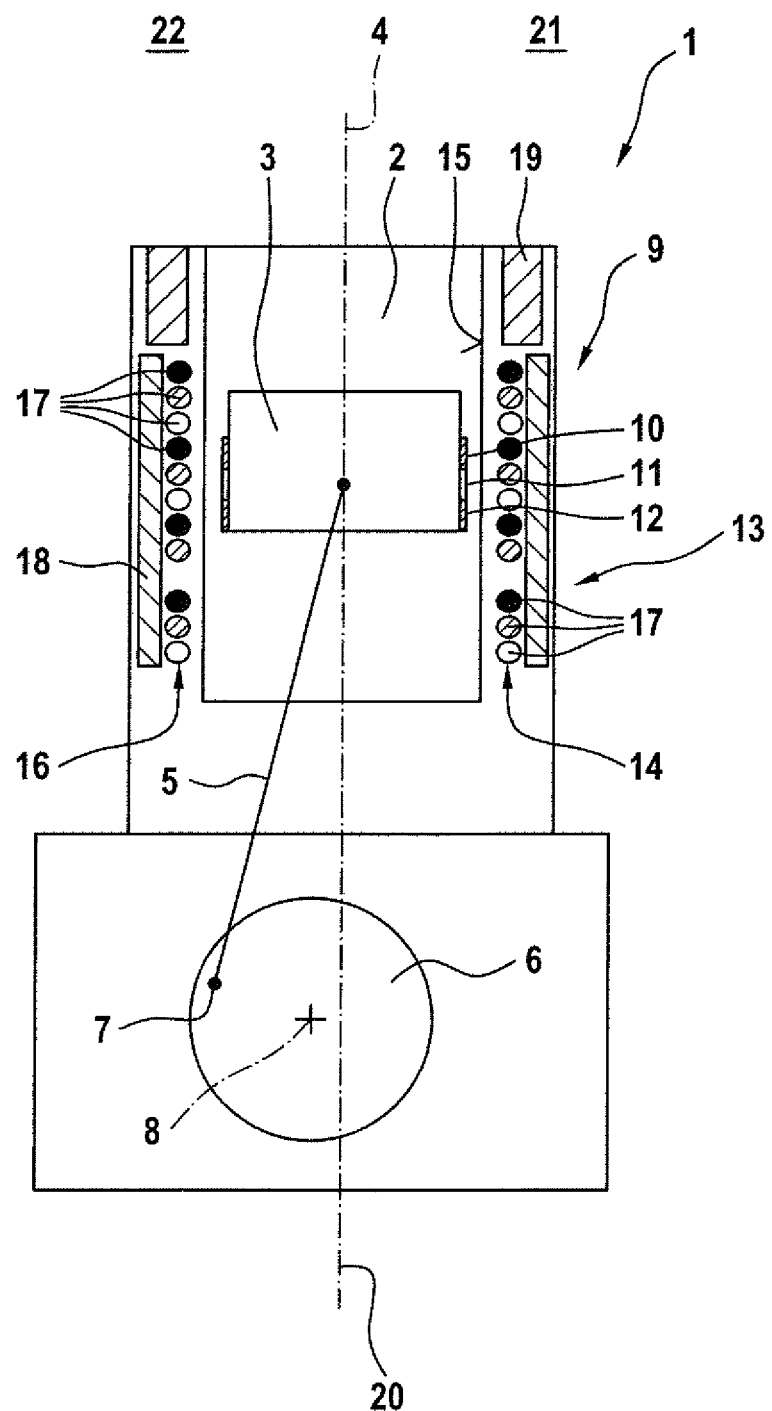
FIG. 1 shows a schematic cross section through a region of an internal combustion engine, wherein a linear motor is assigned to a piston of the internal combustion engine.

Throughout all the Figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

FIG. 1 shows a schematic cross section through a region of an internal combustion engine 1. The internal combustion engine has at least one cylinder 2, in which a piston 3 is arranged linearly displaceable, in particular in axial direction with respect to a longitudinal center axis 4 of the cylinder 2. The piston 3 is operatively connected with a crankshaft 6, in particular with a crank pin 7 of the crankshaft 6, via a piston rod 5. The crankshaft 6 is supported for rotation about a rotation axis 8. The rotation axis 8 can but does not have to intersect with the longitudinal center axis 4. Rather the rotation: axis can—as shown here—be arranged skewed with respect to the longitudinal center axis. The piston rod 5 preferably engages on one side directly on the piston 3 and on the other side preferably on the crankshaft 6 or the crank pin 7. Via the piston rod 5 a direct connection between the piston 3 and the crankshaft 6 is thus realized.

Assigned to the cylinder 2 is a linear motor 9. For this purpose the piston 3 is configured as a rotor of the linear motor 9. For this purpose the piston has at least one permanent magnet 10, in the here shown exemplary embodiment multiple permanent magnets 10, 11 and 12. The permanent magnet 10 or the permanent magnets 10, 11 and 12 engage about the piston 3 in circumferential direction with respect to the longitudinal center axis 4, preferably completely.

The linear motor 9 further has a stator 13, which has at least one stator element 14. The stator element 14 is operable independently and engages only partially about the cylinder 2 in circumferential direction. The stator element is preferably adjusted to the shape of the cylinder 2, i.e., it has a curvature so that the stator element has the same distance in radial direction to a piston run-surface 15 of the cylinder at different positions in circumferential direction. The stator element 14 is preferably configured as a stator segment.

Besides the stator element 14 at least one further stator segment 16 can be provided. When viewed in circumferential direction the further stator segment 16 preferably directly adjoins the stator element 14, at least on one side, in particular however on both sides. This means that the stator element 14 and the stator segment 16 together completely engage about the cylinder 2 in circumferential direction. Hereby the stator element 14 and the stator segment 16 may overlap each other in circumferential direction.

The stator element 14 and the stator segment 16 are each composed of a plurality of windings 17 of which in the instant case only one winding is exemplarily drawn in. However the windings 17 of the stator element 14 are hereby impingeable with electrical current independent of the windings 17 of the stator segment 16 so that the stator element 14 can be operated independent of the stator segment 16.

For cooling the internal combustion engine 1 the cylinder 2 is surrounded in circumferential direction at least partially, in particular completely by a water jacket 18. The stator 13, in particular the stator element 14 and/or the stator segment 16, are arranged in radial direction between the water jacket 18 and the piston run surface 15. Above the water jacket 18 a further water jacket 19 is present. The further water jacket together with the water jacket 18 or independent therefrom can be impinged with coolant, in particular cooling water. When viewed in cross section the water jacket 19 overlaps the water jacket 18 and/or the stator 13 in each case at least partially, in particular completely. The water jackets 18 and 19 ensure a sufficient cooling of the internal combustion engine 1 and at the same time also accomplish a cooling of the linear motor 9.

The cylinder 2 is divided by an imagined plane 20, which includes the longitudinal center axis 4 of the cylinder 2 and is arranged parallel to the rotation axis 8 of the crankshaft 6 or also includes the rotation axis. On one side of the plane 20 a pressure side 21 is situated and on the opposing side a counter pressure side 22. During operation of the internal combustion engine 1 the piston 3 is urged in the direction of the pressure side 21 by gas forces acting on it or by a counter force which is exerted on the piston via the piston rod 5 and which is oriented in opposition to the gas forces. A component of the counter force, which causes this is referred to as transverse force. A force vector of the transverse force is perpendicular to the plane 20 (here not shown).

This transverse force is to be counteracted by correspondingly operating the linear motor 9. For this purpose in particular the stator element 14 of the stator 13 is operated i.e., impinged with electrical current. This can be performed intermittently so that the compensation force which is generated by means of the linear motor 9, and is directed in opposition to the counter force, is the stronger the stronger the transverse force acts on the piston 3. This generally means that the stator element 14 is only operated during part of the work cycle of the internal combustion engine 1 or is at least operated differently than the at least one further stator segment 16. Also, the stator element 14 can be operated differently in the crankshaft region than outside the crankshaft region, in particular with a different power. Hereby the linear motor 9 can for example be operated so that a smoothening of the torque provided by the internal combustion engine occurs.

Figure 2:
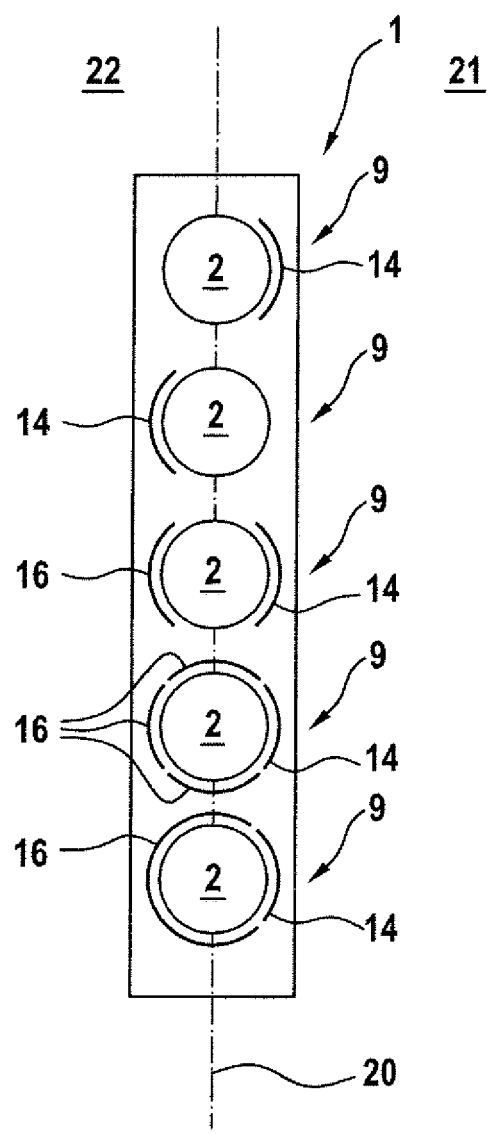
FIG. 2 shows a schematic representation of the internal combustion engine showing different configurations of the linear motor by way of multiple cylinders.

FIG. 2 shows a schematic representation of the internal combustion engine 1. Shown are multiple cylinders 2 which are each assigned different configurations of the linear motor 9. Thus from top to bottom five cylinders 2 with different configurations of the linear motor 9 are shown. Generally, however, the internal combustion engine 1 preferably has only one type of the linear motor 9 so that the same linear motor 9 is assigned to each of the respective cylinders 2. However, also different types of the linear motor 9 can be assigned to the same internal combustion engine 1.

In the first embodiment of the linear motor 9 only the stator element 14 is provided. The stator element 14 only partially engages around the cylinder 2 in circumferential direction. Hereby the stator element is arranged on the pressure side 21. In the second embodiment on the other hand the stator element 14 is provided on the counter pressure side 22. The third embodiment has besides the stator element 14 the stator segment 16, wherein the stator element 14 is situated on the pressure side 21 and the stator segment 16 on the counter pressure side 22. The stator element 14 and the stator segment 16 have the same extent in circumferential direction and are arranged symmetrical with respect to the plane 20.

The fourth embodiment of the linear motor 9 has besides the stator element 14 multiple stator segments 16, in the here shown exemplary embodiment three stator segments 16. The stator element 14 and the stator segments 16 each have the same extent in circumferential direction and are arranged uniformly distributed over the circumference of the cylinder 2. The fifth embodiment has the stator element 14 and has exactly one stator segment 16. While the stator element 14 is situated exclusively on the pressure side 21 the stator segment 16 extends over the entire counter pressure side 22 up to the pressure side 21, in particular only on one side or (as shown here) on both sides. The stator segment 16 borders preferably at least on one side, in particular on both sides, directly on the stator element 14.

By means of the here described internal combustion engine 1 with the integrated linear motor 9 the transverse force acting during operation of the internal combustion engine on the piston 3 can be compensated at least partially, particularly preferably completely. This enables a low-friction operation of the internal combustion engine 1 and thus a high efficiency.

What is claimed as new and desired to be protected by Letters Patent is set forth in the appended claims and includes equivalents of the elements recited therein:

1. An internal combustion engine, comprising:
    a cylinder;
    a piston supported in the cylinder for linear displacement, said piston being operatively connected with a crankshaft of the internal combustion engine via a piston rod; and
    a linear motor comprising a stator and a rotor, said stator having an independently operable circular stator element assigned to the cylinder and partially surrounding the piston in circumferential direction over a part of a circumference with respect to a longitudinal center axis of the cylinder, said rotor being assigned to or forming a part of the piston, said linear motor having said stator with said circular stator element being operable for exerting on the piston a compensation force directed in radial direction.

2. The internal combustion engine of claim 1, wherein the stator element is configured as a circular stator segment which extends in the circumferential direction over a part of a circumference, said stator having at least one further circular stator segment arranged in the circumferential direction adjacent to the circular stator segment over a part of the same circumference, said circular stator segment and said further circular stator segment each having a curvature such that the they have a same distance in a radial direction to a piston-run surface of the cylinder in the circumferential direction.

3. The internal combustion engine of claim 1, further comprising a cylinder crankcase, said cylinder crankcase comprising the cylinder, said stator being arranged in the cylinder crankcase.

4. The internal combustion engine of claim 1, wherein the cylinder is at least partially surrounded in the circumferential direction by a water jacket and the stator is arranged in radial direction between the water jacket and a piston run-surface of the cylinder.

5. The internal combustion engine of claim 4, wherein the cylinder is at least partially surrounded in circumferential direction by a further water jacket and the stator is arranged in axial direction adjacent to the further water jacket.

6. The internal combustion engine of claim 5, wherein the stator is arranged below the further water jacket.

7. The internal combustion engine of claim 1, wherein the stator element is arranged at least partially on a side of an imagined plane which includes the longitudinal center axis of the cylinder, said plane being arranged parallel to a rotation axis of the crankshaft.

8. The internal combustion engine of claim 7, wherein the stator element is arranged completely on the side of the imagined plane.

9. The internal combustion engine of claim 1, wherein a transverse force which is perpendicular to the plane and acts on the piston due to gas forces occurring during a combustion cycle of the internal combustion engine, points from a counter pressure side of the plane in a direction of a pressure side of the plane, said stator element being arranged on the pressure side.

10. The internal combustion engine of claim 1, wherein the rotor has at least one permanent magnet or is configured as a squirrel cage rotor.

11. A method for operating an internal combustion engine, comprising:
    providing an internal combustion engine, which comprises
    a cylinder;
    a piston supported in the cylinder for linear displacement, said piston being operatively connected with a crankshaft of the internal combustion engine via a piston rod, and a linear motor comprising a stator and a rotor, said stator having an independently operable circular stator element assigned to the cylinder and partially surrounding the piston in circumferential direction over a part of a circumference with respect to a longitudinal center axis of the cylinder, said rotor being assigned to or forming a part of the piston; and operating the linear motor having said stator with said circular stator element for exerting on the piston a compensation force directed in radial direction.

12. The method of claim 11, further comprising configuring the circular stator element as a circular stator segment which extends in the circumferential direction over a part of a circumference, and providing in said stator at least one further circular stator segment arranged in the circumferential direction adjacent to the circular stator segment over a part of the same circumference, and forming said circular stator segment and said further circular stator segment to have a curvature such that they have a same distance in a radial direction to a piston-run surface of the cylinder in the circumferential direction.

13. The method of claim 11, wherein the linear motor is operated so that the compensation force counteracts a transverse force which acts on the piston due to gas forces occurring during a combustion cycle of the internal combustion engine.

* * * * *